United States Patent
Wakumoto et al.

(10) Patent No.: US 8,594,096 B2
(45) Date of Patent: Nov. 26, 2013

(54) DYNAMIC HARDWARE ADDRESS ASSIGNMENT TO NETWORK DEVICES IN A SWITCH MESH

(75) Inventors: Shaun Wakumoto, Roseville, CA (US); Andrew T Bare, Antelope, CA (US); Mark Gooch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

(21) Appl. No.: 13/285,498

(22) Filed: Oct. 31, 2011

(65) Prior Publication Data

US 2013/0107755 A1    May 2, 2013

(51) Int. Cl.
*H04L 12/28* (2006.01)
(52) U.S. Cl.
USPC ............................ 370/392; 370/400; 370/411
(58) Field of Classification Search
None
See application file for complete search history.

(56) References Cited

U.S. PATENT DOCUMENTS

| | | | |
|---|---|---|---|
| 7,801,150 B1 | 9/2010 | Rupavatharam | |
| 2004/0064591 A1* | 4/2004 | Noble | 709/250 |
| 2006/0002393 A1* | 1/2006 | Lappin et al. | 370/392 |
| 2006/0015648 A1* | 1/2006 | Lappin et al. | 709/246 |
| 2008/0285553 A1* | 11/2008 | Abdulla et al. | 370/389 |
| 2010/0036903 A1 | 2/2010 | Ahmad et al. | |
| 2011/0026403 A1* | 2/2011 | Shao et al. | 370/235 |
| 2011/0080911 A1 | 4/2011 | Guichard et al. | |
| 2011/0134924 A1 | 6/2011 | Hewson et al. | |
| 2012/0257507 A1* | 10/2012 | Sato et al. | 370/235 |

FOREIGN PATENT DOCUMENTS

| | | |
|---|---|---|
| CN | 100591048 | 2/2010 |
| GB | 2467424 | 8/2010 |

OTHER PUBLICATIONS

Load Balancing with Networking Technologies; http://www.iphelp.ru/faq/19/ch11ev1sec2.html >, Oct. 26, 2011.

* cited by examiner

*Primary Examiner* — Chi Pham
*Assistant Examiner* — Soon-Dong D Hyun
(74) *Attorney, Agent, or Firm* — Robert M. Brush

(57) ABSTRACT

Dynamic hardware address assignment to network devices in a switch mesh is described. In an example, a network device in a switch mesh dynamically assigns a hardware address to a network interface. The network device receives an address request from a client through the switch mesh. The network device calculates an index value for the client based on data in the address request. The network device selects the hardware address of a plurality of hardware addresses assigned to the network interface based on the index value. The switch mesh includes a plurality of traffic paths respectively for the plurality of hardware addresses. The network device sends the hardware address in a reply to the client through the switch mesh.

15 Claims, 5 Drawing Sheets

DYNAMIC HARDWARE ADDRESS ASSIGNMENT TO NETWORK DEVICES IN A SWITCH MESH

BACKGROUND

In a network, a router assigns a single media access control (MAC) address for a given internet protocol (IP) interface. Clients use the IP interface of the router to route traffic to specific destinations. The clients can form part of a logical division of an IP network referred to as a "subnet". The clients can use the router to route traffic outside of the subnet. The network can include switches to switch traffic among clients within the same subnet and between clients and the router. In some cases, the switches can be formed as a "mesh network." In a mesh network, switches are connected to each other such that there are many paths between clients and other network devices on the mesh network. A message can propagate along a path by hopping from switch to switch until the destination is reached. A router having a single MAC address for its IP interface and being part of a switch mesh environment can result in several problems.

For example, in some switch mesh environments, all traffic is forwarded through the mesh based on destination MAC address. Thus, for any given MAC address destination, there is one path through the mesh (traffic can enter the path closer or farther from the destination, but it is still the same path). If many clients are sending traffic to an outside subnet, and the router IP interface resides on a mesh switch (i.e., the router is also a mesh switch), all traffic will take the same path through the mesh. This is because only one MAC address is assigned to the router's IP interface, and hence there is only one path through the mesh to the router's IP interface.

BRIEF DESCRIPTION OF THE DRAWINGS

Some embodiments of the invention are described with respect to the following figures.

DETAILED DESCRIPTION

Dynamic hardware address assignment to network devices in a switch mesh is described. In an embodiment, a client desires to send traffic to a network interface of a particular network device in the switch mesh (e.g., a router). The client sends an address request to the network device through the switch mesh. The network device sends an address reply to the client having a hardware address selected from a plurality of hardware addresses associated with the network interface. The hardware address can be any type of address used to identify devices communicating on a data link layer (e.g., layer two in the Open Systems Interconnection (OSI) model). For example, in a switch mesh having Ethernet connections, the hardware addresses can be media access control (MAC) addresses. The switch mesh can have a plurality of traffic paths to the network device respectively for the plurality of hardware addresses (e.g., a different traffic path through the mesh for each of the hardware addresses associated with the network interface). The switch mesh can switch traffic originating from the client to the network interface of the network device over one of the traffic paths based on the hardware address returned in the address reply.

The switch mesh can forward traffic based on destination hardware address. If a particular network interface of a device has only one hardware address, then the switch mesh will include only a single path to the network interface for all traffic destined for the network interface. This can cause bottlenecks and is vulnerable to loss of traffic when a link along the path breaks. Having only one path to a network interface needed by clients defeats the purpose of having the switch mesh, which is designed to provide redundant paths. Accordingly, embodiments of the invention provide a network device that has multiple hardware addresses assigned to its network interface. In this manner, the network device, such as a router, can have multiple paths through the switch mesh for the same network interface. This allows for the traffic sent to the network interface to be spread out over multiple paths through the mesh, eliminating bottlenecks. The multiple paths also provide for redundant links to the network interface through the mesh. Embodiments of the invention can be understood with reference to the following example implementations.

Figure 1:
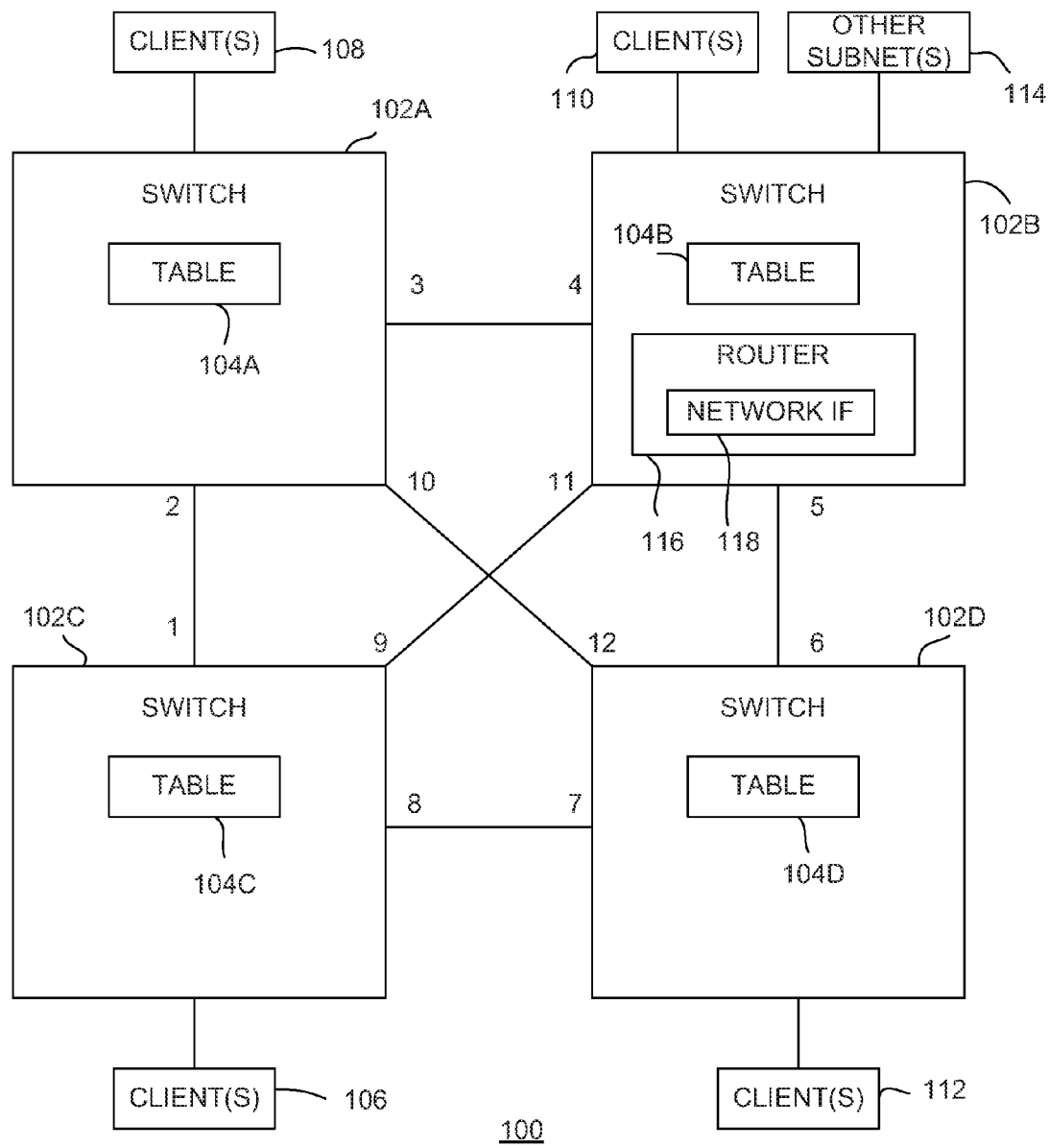
FIG. 1 is a block diagram of a network according to an example implementation.

FIG. 1 is a block diagram of a network 100 according to an example implementation. The network 100 includes a plurality of network devices 102 (switches 102A-D are shown for example). The switches 102 are coupled to form a switch mesh. Each of the switches 102 includes a plurality of ports. In the present example, the switch 102C includes a port 1 coupled to a port 2 of the switch 102A, a port 9 coupled to a port 11 of the switch 102B, and a port 8 coupled to a port 7 of the switch 102D. The switch 102A includes a port 3 coupled to a port 4 of the switch 102B, and a port 10 coupled to a port 12 of the switch 102D. The switch 102B includes a port 5 coupled to a port 6 of the switch 102D. Each of the switches 102 includes a table that relates hardware addresses to ports (e.g., tables 104A-D are shown for switches 102A-D, respectively). The switch 102B also includes a router 116 having a network interface 118. The network 100 can also include at least one client 106 coupled to the switch 102C, at least one client 108 coupled to the switch 102A, at least one client 110 coupled to the switch 102B, and/or at least one client 112 coupled to the switch 102D. The clients 106-112 can be part of the same sub-network (subnet). The router 116 can route traffic between the switch mesh and other networks (e.g., other subnet(s) 114).

The switches 102 switch traffic to and from the clients 106-112 (e.g., among the switches 102A-102D and between switches 102A-102D and the clients 106-112). The clients 106-112 can use the router 116 by sending traffic to a hardware address of router 116. The network interface 118 of the router 116 is associated with a network address. A network address can be any type of address used to identify interfaces communicating on a network layer (e.g., layer three in the OSI model). For example, in a Transmission Control Protocol/Internet protocol (TCP/IP) network, the network address can be an Internet Protocol (IP) address. The switch 102D assigns a plurality of hardware addresses as destination addresses for switching traffic to the network interface 118. As described above, a hardware address can be any type of address used to identify devices communicating on a data link layer (e.g., layer two in the OSI model). For example, in an Ethernet configuration, the hardware addresses can be MAC addresses. In an example, the switches 102 switch traffic based on hardware addresses (e.g., layer-2 switches), and the router 116 routes traffic based on network addresses (e.g., a layer-3 device). It is to be understood that the switches 102 can also be capable of switching based on other protocol layers, but such features are not discussed in the present example.

Since there are multiple hardware addresses to which traffic for the network interface 118 can be sent, the clients 106-112 must know which hardware address to use. In an example, a client sends an address request to the router 116 through the switch mesh. The address request can include a hardware address (e.g., MAC address) and a network address (e.g., IP address) each associated with the client. In an example, the address request can be an Address Resolution Protocol (ARP) request. The client knows the network address of the network interface 118. The client can obtain a hardware address for the network interface 118 from a local cache, or the client can broadcast the address request to any interface having the network address.

Upon receiving the address request, the router 116 or the switch 102B selects a hardware address from the plurality of hardware addresses designated for the network interface 118. In an example, the hardware address can be selected by calculating an index value for the client based on data in the address request. The index value can be computed, for example, using a hash function having the client's hardware and network addresses as parametric input (any known hash function can be used). Once a hardware address is selected, the router 116 or the switch 102B sends a reply message to the client with the selected hardware address. In an example, the reply message is an ARP reply message. The client can then use the selected hardware address as a destination hardware address for sending traffic to the network interface 118.

The switches 102 are configured to have a plurality of traffic paths to the network interface 118 of the router 116 for the plurality of designated hardware addresses, respectively. That is, for each hardware address designated for the network interface 118, the switch mesh can have a different traffic path. Switches 102 switch traffic originated by a client to the network interface 118 over a respective traffic path based on the hardware address that the client obtained in the address request.

Figure 2:
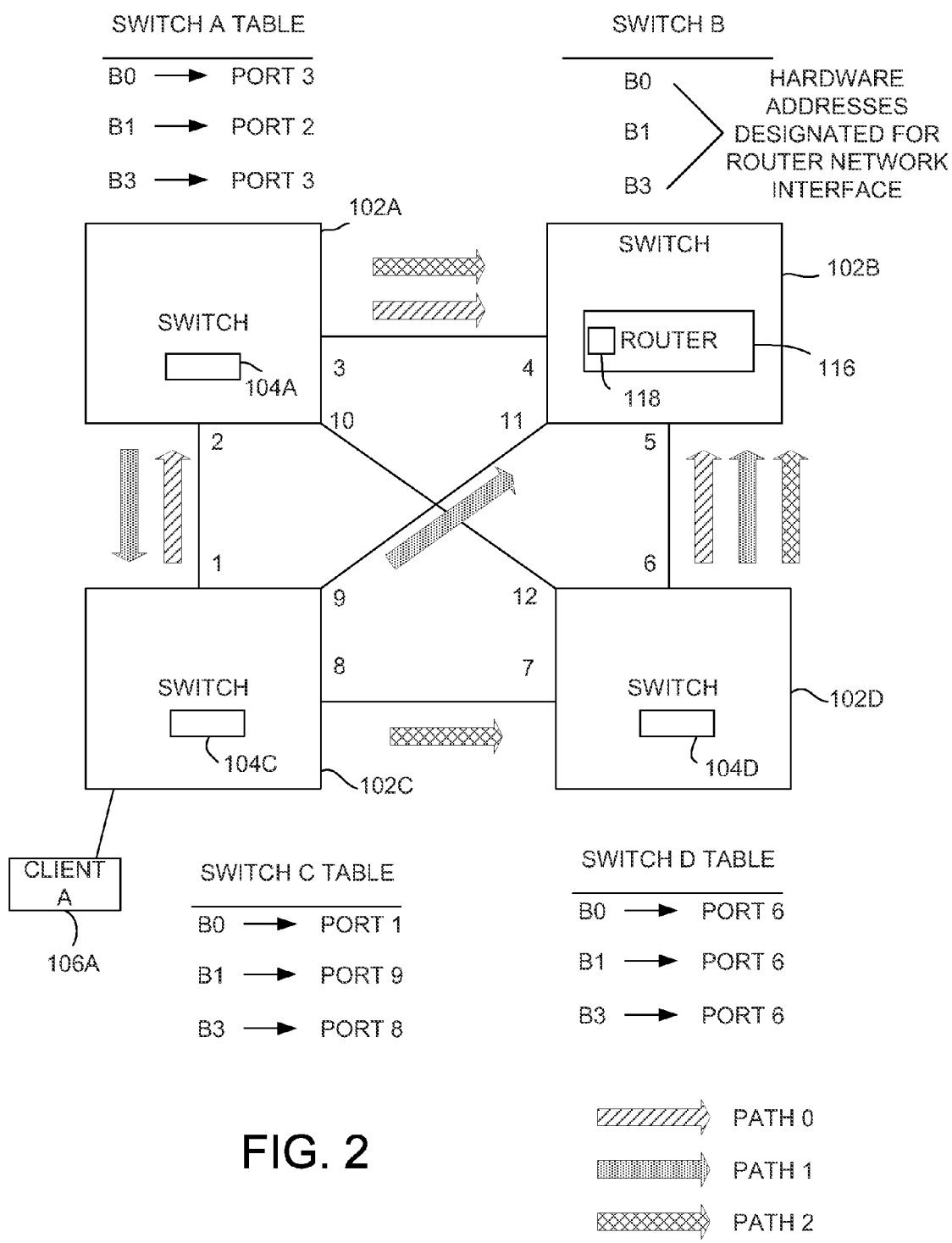
FIG. 2 is a block diagram of a configuration of the network of FIG. 1 having specific traffic paths according to an example implementation.

FIG. 2 is a block diagram of a configuration 200 of the network 100 having specific traffic paths according to an example implementation. Elements of FIG. 2 that are the same or similar to those of FIG. 1 are designated with identical reference numerals and are described in detail above. In the present example, the network interface 118 of the router 116 is associated with three hardware addresses, denoted B0, B1, and B3. The switches 102A-D provide three traffic paths for the three hardware addresses B0, B1, and B2 B3, respectively denoted Path 0, Path 1, and Path 2. The traffic paths are established using entries in the tables 104A, 104C, and 104D in the switches 102A, 102C, and 102D, respectively. Entries in the table 104C for the switch 102C (denoted "Switch C Table") include mapping hardware addresses B0, B1, and B3 to ports 1, 9, and 8, respectively, of the switch 102C. Entries in the table 104A for the switch 102A (denoted "Switch A Table") include mapping hardware addresses B0, B1, and B3 to ports 3, 2, and 3, respectively, of the switch 102A. Entries in the table 104D for the switch 102D (denoted "Switch D Table") include mapping each of the hardware addresses B0, B1, and B3 to port 6 of the switch 102D.

Assume a specific client 106A coupled to the switch 102C needs to send traffic to the network interface 118. If the client 106A has received hardware address B0 for the network interface 118, traffic will follow Path 0 from switch 102C, to switch 102A, and to switch 102B. If the client 106A has received hardware address B1 for the network interface 118, traffic will instead follow Path 1 from switch 102C directly to switch 102B. If the client 106A has received hardware address B2 for the network interface 118, traffic will follow Path 2 from switch 102C, to switch 102D, and to switch 102B. The client 106A can obtain one of the hardware addresses for the network interface 118 as described above.

Figure 3:
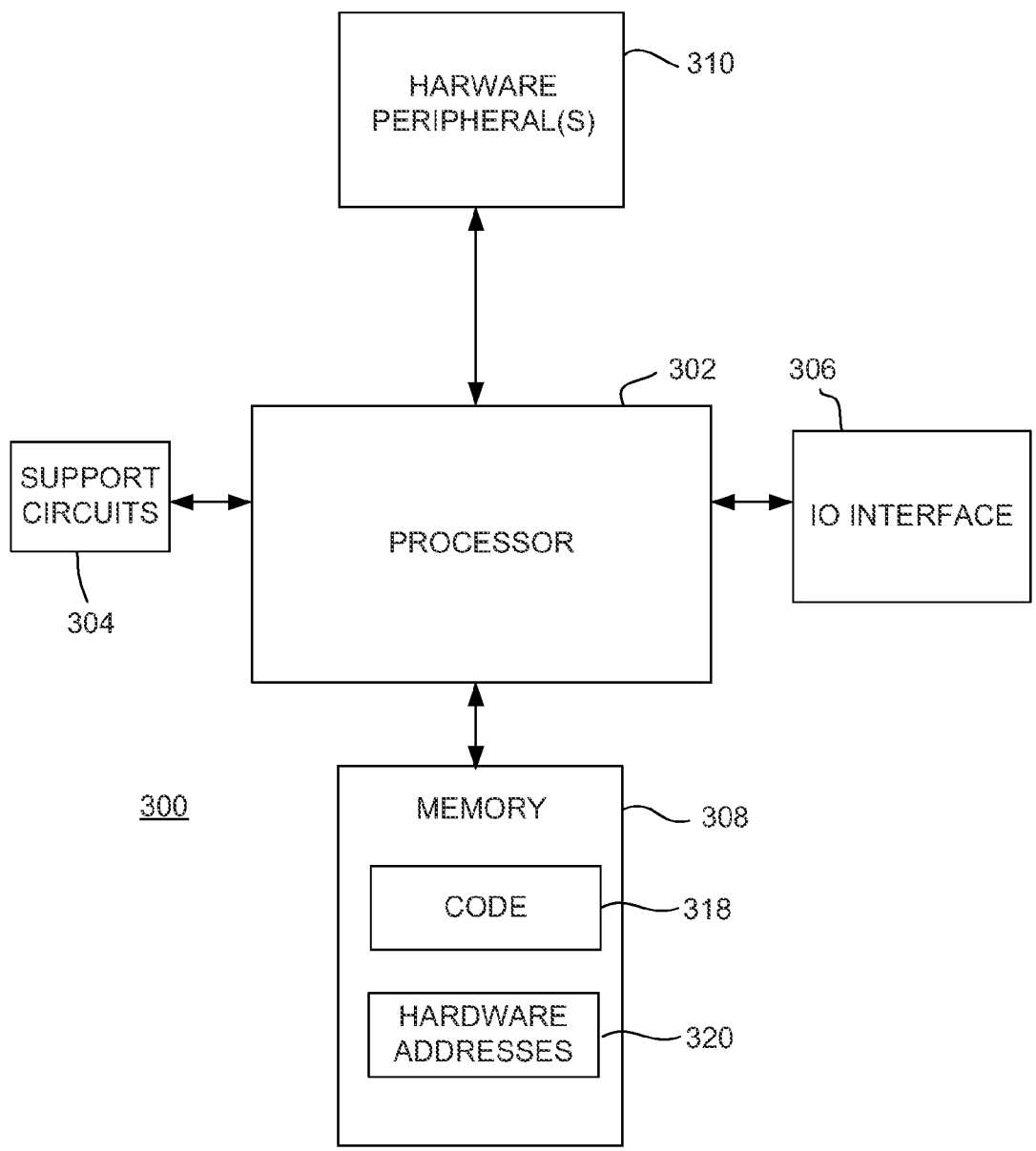
FIG. 3 is a block diagram depicting a network device according to an example implementation.

FIG. 3 is a block diagram depicting a network device 300 according to an example implementation. The network device 300 includes a processor 302, an IO interface 306, and a memory 308. The computer 300 can also include support circuits 304 and hardware peripheral(s) 310 (e.g., embedded devices). The processor 302 includes any type of microprocessor, microcontroller, microcomputer, or like type computing device known in the art. The support circuits 304 for the processor 302 can include cache, power supplies, clock circuits, data registers, IO circuits, and the like. The IO interface 306 can be directly coupled to the memory 308, or coupled to the memory 308 through the processor 302. The memory 308 can include random access memory, read only memory, cache memory, magnetic read/write memory, or the like or any combination of such memory devices. The hardware peripheral(s) 310 can include various hardware circuits that perform functions on behalf of the processor 302.

The memory 300 stores a plurality of hardware addresses 320 and code 318. The code 318 can be executed by the processor 302 to implement dynamic assignment of hardware addresses on behalf of an interface or device (e.g., the network interface 118 of the router 116 shown in FIG. 1). The processor 302 can execute the code 318 to receive address requests from clients, calculate index values for clients based on data in the address requests, select a hardware address for each of the clients from the hardware addresses 320 based on the index values, and send a reply to each of the clients having the hardware address as selected for the respective client. In an example, each of the address requests includes a hardware address (e.g., a MAC address) and a network address (e.g., an IP address). The index values can be computed using a hash function having the hardware and network addresses as parametric input. In an example, the address requests and replies comprise ARP requests and replies. In an example, each of the hardware addresses 320 is a MAC address. The network device 300 can be a switch (e.g., the switch 102B), a router (e.g., the router 116), or any other type of device used in a network. In an example, all or a portion of the dynamic assignment of hardware addresses can be performed by a dedicated circuit on the hardware peripheral(s) 310, rather than or in addition to execution of the code 318 by the processor 302. For example, the hardware peripheral(s) 310 can include a programmable logic device (PLD), such as a field programmable gate array (FPGA), which can be programmed to implement some or all of the functions of the dynamic assignment described above.

Figure 4:
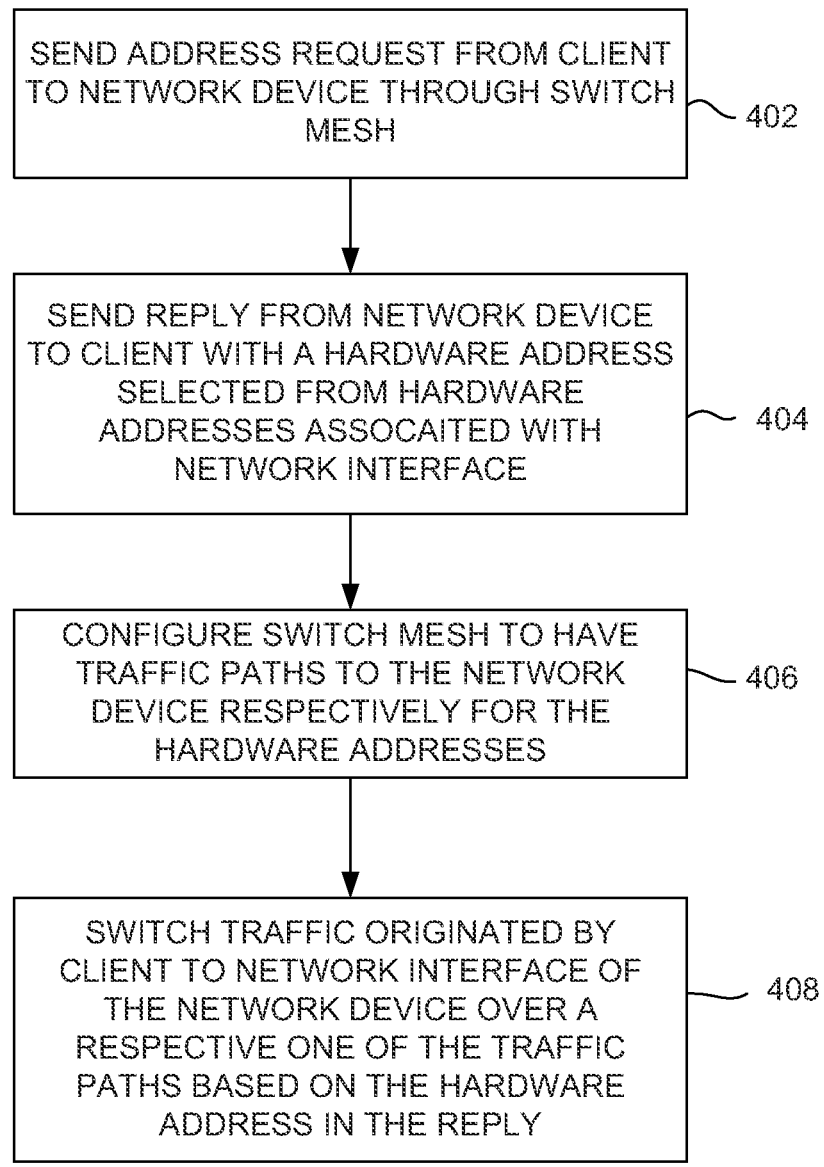
FIG. 4 is a flow diagram showing a method of switching traffic to a network interface of a network device in a switch mesh according to an example implementation.

FIG. 4 is a flow diagram showing a method 400 of switching traffic to a network interface of a network device in a switch mesh according to an example implementation. The method 400 begins at step 402, where an address request is sent from a client to the network device through the switch mesh. At step 404, a reply is sent from the network device to the client having a hardware address selected from a plurality of hardware addresses associated with the network interface. At step 406, the switch mesh is configured to have a plurality of traffic paths to the network device respectively for the plurality of hardware addresses. At step 408, traffic originated by the client device is switched to the network interface of the network device over a respective one of the traffic paths based on the hardware address in the reply.

In an example, step 404 includes calculating an index value for the client based on data in the address request, and selecting the hardware address from the plurality of hardware addresses based on the index value. In an example, the address request includes a hardware address and a network address, and the index value can be computed using a hash of the hardware address and/or the network address. In an example, the address request and reply comprise an ARP request and reply.

Figure 5:
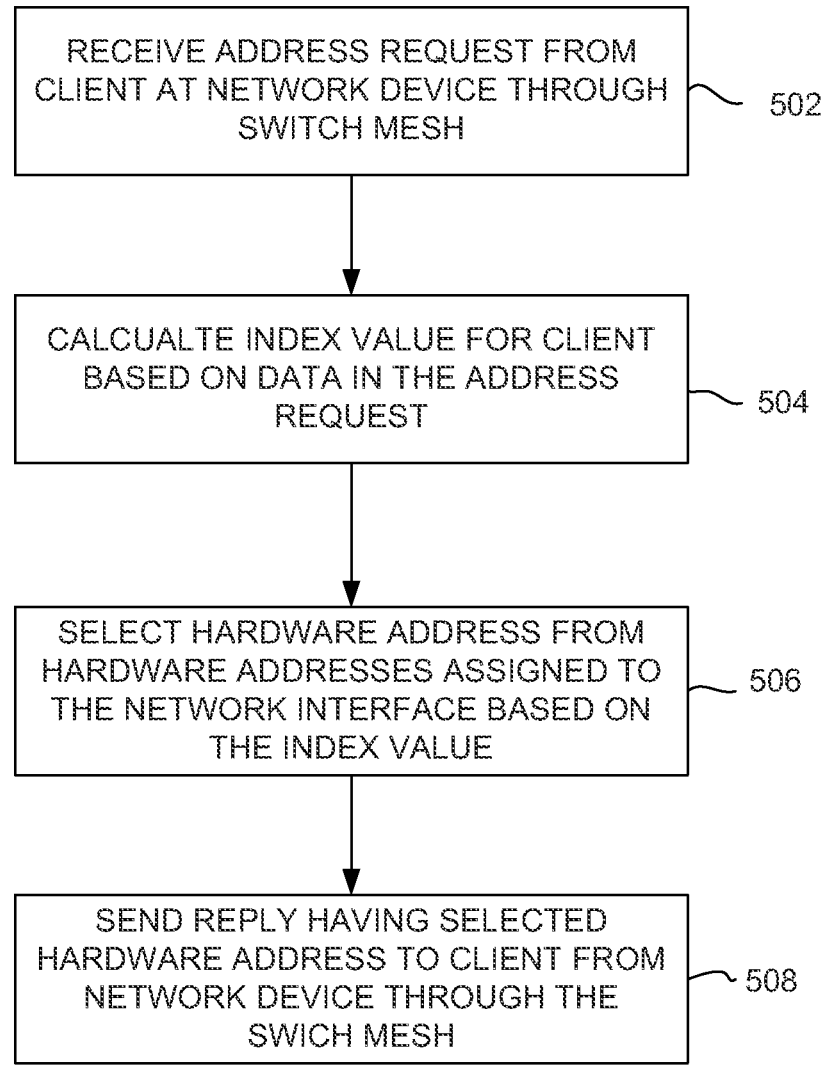
FIG. 5 is a flow diagram showing a method of dynamically assigning a hardware address to a network interface of a network device in a switch mesh according to an example implementation.

FIG. 5 is a flow diagram showing a method 500 of dynamically assigning a hardware address to a network interface of a network device in a switch mesh according to an example implementation. The method 500 begins at step 502, where an address request is received at the network device from a client through the switch mesh. At step 504, an index value is calculated for the client based on data in the address request. At step 506, the hardware address is selected from a plurality of hardware addresses assigned to the network interface based on the index value. The switch mesh includes a plurality of traffic paths respectively for the plurality of hardware addresses. At step 508, the hardware address is sent in a reply from the network device to the client through the switch mesh.

In an example, the address request includes hardware and network addresses each associated with the client, and the index value is calculated using a hash function having the hardware and/or the network address as parametric input. In an example, the address request comprises an ARP request, and the reply comprises an ARP reply. In an example, each of the plurality of hardware addresses comprises a MAC address, and the network interface comprises an IP interface. In an example, the switch mesh includes a plurality of switches, each of the plurality of switches including a table to switch traffic along each of the plurality of traffic paths.

The methods described above may be embodied in a computer-readable medium for configuring a computing system to execute the method. The computer readable medium can be distributed across multiple physical devices (e.g., computers). The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc., just to name a few. Other new and various types of computer-readable media may be used to store machine readable code discussed herein.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of dynamically assigning a hardware address to a network interface of a network device in switch mesh, comprising:
   receiving an address request at the network device from a client through the switch mesh, wherein the switch mesh includes a plurality of switches;
   calculating an index value for the client based on data in the address request;
   selecting the hardware address of a plurality of hardware addresses assigned to the network interface of the network device based on the index value, the switch mesh having a plurality of traffic paths between the plurality of switches respectively for the plurality of hardware addresses; and
   sending the hardware address in a reply from the network device to the client through the switch mesh.

2. The method of claim 1, wherein the address request includes a media access control (MAC) address and an internet protocol (IP) address each associated with the client, and wherein the index value is calculated using a hash function having the MAC address and the IP address as parametric input.

3. The method of claim 2, wherein the address request comprises an address resolution protocol (ARP) request, and the reply comprises an ARP reply.

4. The method of claim 1, wherein each of the plurality of hardware addresses comprises a media access control (MAC) address, and wherein the network interface comprises an internet protocol (IP) interface.

5. The method of claim 1, wherein each of the plurality of switches includes a table to switch traffic along each of the plurality of traffic paths.

6. A method of switching traffic to a network interface of a network device in a switch mesh, comprising:
   sending an address request from a client to the network device through the switch mesh wherein the switch mesh includes plurality of switches;
   sending a reply from the network device to the client having a hardware address selected from a plurality of hardware addresses associated with the network interface;
   configuring the switch mesh to having a plurality of traffic paths to the network device respectively for the plurality of hardware addresses; and
   switching traffic originated by the client to the network interface of the network device over a respective one of the plurality of traffic paths between the plurality of switches based on the hardware address.

7. The method of claim 6, wherein the step of sending a reply comprises:
   calculating an index value for the client based on data in the address request; and
   selecting the hardware address from the plurality of hardware addresses assigned to the network interface of the network device based on the index value.

8. The method of claim 7, wherein the address request includes a media access control (MAC) address and an internet protocol (IP) address each associated with the client, and wherein the index value is calculated using a hash function having the MAC address and the IP address as parametric input.

9. The method of claim 8, wherein the address request comprises an address resolution protocol (ARP) request, and the reply comprises an ARP reply.

10. The method of claim 6, wherein each of the plurality of hardware addresses comprises a media access control (MAC)

address, and wherein the network interface comprises an internet protocol (IP) interface.

11. The method of claim 6, wherein each of the plurality of switches includes a table to switch traffic along each of the plurality of traffic paths.

12. A network device in a switch mesh, comprising:
an input/output (IO) interface having a plurality of hardware addresses; and
a processor to receive address requests from clients via a plurality of switches included in the switch mesh, calculate index values for the clients based on data in the address requests, select a hardware address for each of the clients from the plurality of hardware addresses based on the index values, the switch mesh having a plurality of traffic paths between the plurality of switches, and send a reply to each of the clients having the hardware address as selected for the respective client.

13. The network device of claim 12, wherein each of the address requests includes a media access control (MAC) address and an internet protocol (IP) address associated with a respective client, and wherein each of the index values is calculated using a hash function having the MAC address and the IP address of the respective client as parametric input.

14. The network device of claim 13, wherein the address requests comprises address resolution protocol (ARP) requests, and each reply comprises an ARP reply.

15. The network device of claim 12, wherein each of the plurality of hardware addresses comprises a media access control (MAC) address.

* * * * *

UNITED STATES PATENT AND TRADEMARK OFFICE
CERTIFICATE OF CORRECTION

PATENT NO. : 8,594,096 B2
APPLICATION NO. : 13/285498
DATED : November 26, 2013
INVENTOR(S) : Shaun Wakumoto et al.

It is certified that error appears in the above-identified patent and that said Letters Patent is hereby corrected as shown below:

In the Specification

In column 3, line 55, delete "B2 B3," and insert -- B3, --, therefor.

In the Claims

In column 6, line 38, in Claim 6, delete "mesh" and insert -- mesh, --, therefor.

In column 6, line 39, in Claim 6, delete "includes" and insert -- includes a --, therefor.

Signed and Sealed this
Twenty-fifth Day of February, 2014

Michelle K. Lee
*Deputy Director of the United States Patent and Trademark Office*